US011587284B2

(12) United States Patent
Coffey et al.

(10) Patent No.: US 11,587,284 B2
(45) Date of Patent: *Feb. 21, 2023

(54) VIRTUAL-WORLD SIMULATOR

(71) Applicant: Disney Enterprises, Inc., Burbank, CA (US)

(72) Inventors: Dane M. Coffey, Burbank, CA (US); Evan M. Goldberg, Burbank, CA (US); Steven M. Chapman, Newbury Park, CA (US); Daniel L. Baker, Los Angeles, CA (US); Matthew Deuel, Playa Vista, CA (US); Mark R. Mine, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,301

(22) Filed: Nov. 18, 2021

(65) Prior Publication Data

US 2022/0076484 A1    Mar. 10, 2022

Related U.S. Application Data

(63) Continuation of application No. 16/929,912, filed on Jul. 15, 2020, now Pat. No. 11,210,843.

(51) Int. Cl.
*G06T 15/20* (2011.01)
*G05B 19/4155* (2006.01)
*G06T 7/20* (2017.01)
*G06T 15/00* (2011.01)

(52) U.S. Cl.
CPC .......... *G06T 15/20* (2013.01); *G05B 19/4155* (2013.01); *G06T 7/20* (2013.01); *G06T 15/005* (2013.01); *G05B 2219/37074* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| 2010/0157063 A1* | 6/2010 | Basso | G06V 40/23 |
| | | | 348/169 |
| 2014/0267228 A1* | 9/2014 | Ofek | G06T 19/20 |
| | | | 345/419 |
| 2020/0368616 A1* | 11/2020 | Delamont | A63F 13/213 |

* cited by examiner

*Primary Examiner* — Frank S Chen
(74) *Attorney, Agent, or Firm* — Farjami & Farjami LLP

(57) ABSTRACT

In one implementation, a virtual-world simulator includes a computing platform having a hardware processor and a memory storing a software code, a tracking system communicatively coupled to the computing platform, and a projection device communicatively coupled to the computing platform. The hardware processor is configured to execute the software code to obtain a map of a geometry of a real-world venue including the virtual-world simulator, to identify one or more virtual effects for display in the real-world venue, and to use the tracking system to track a moving perspective of one of a user in the real-world venue or a camera in the real-world venue. The hardware processor is further configured to execute the software code to control the projection device to simulate a virtual-world by conforming the identified one or more virtual effects to the geometry of the real-world venue from a present vantage point of the tracked moving perspective.

16 Claims, 6 Drawing Sheets

VIRTUAL-WORLD SIMULATOR

This application is a Continuation of U.S. patent application Ser. No. 16/929,912, filed Jul. 15, 2020.

BACKGROUND

In augmented reality (AR), the appearance of a real-world environment can be digitally modified to provide a user with the sensation of engaging with a virtual-world. AR is increasingly used to produce entertainment experiences that are more immersive and engaging. Moreover, AR can be used to modify images of the real-world through augmentation in ways that have practical applications. Nevertheless, a user wishing to enjoy or otherwise utilize a virtual environment generated using AR must typically view real-world objects through the viewport of an AR enabled personal device, such as AR glasses or goggles, an AR headset, or a suitably configured smartphone or tablet computer, in order to see those real-world objects overlaid by virtual projections. Moreover, conventional approaches to generating AR imagery produce two-dimensional (2D) digital augmentations to three-dimensional (3D) real-world objects.

Despite their inability to provide a true 3D virtual experience, AR glasses, goggles, and headsets can be costly and inconvenient to wear. In addition, the increased concern over the spread of communicable disease will likely mandate burdensome sanitation procedures in usage environments in which wearable AR viewing equipment is shared by multiple users. Furthermore, requiring the use of an AR enabled personal device to enjoy a virtual environment effectively precludes multiple users from sharing the same experience. Consequently, there is a need in the art for a solution enabling one or more users to experience an immersive simulation of a 3D virtual-world that is accurately rendered according to the vantage point of each user.

SUMMARY

There are provided virtual-world simulators and methods for use by such simulators, substantially as shown in and/or described in connection with at least one of the figures, and as set forth more completely in the claims.

DETAILED DESCRIPTION

Figure 1A:
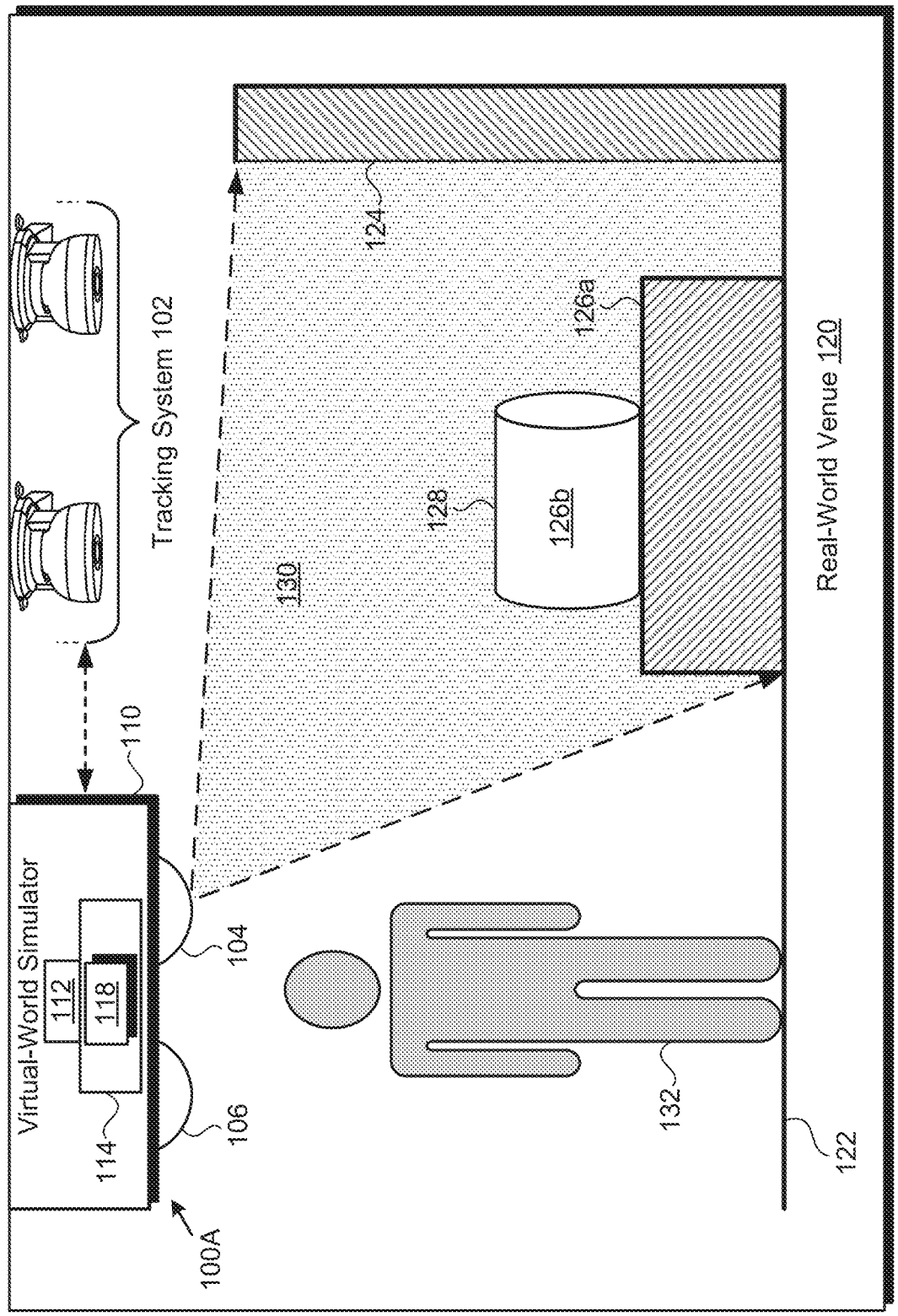
FIG. 1A shows a diagram of an exemplary virtual-world simulator, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses virtual-world simulators and methods for use by such simulators that overcome the drawbacks and deficiencies in the conventional art. According to the present novel and inventive concepts, one or more users can advantageously experience a virtual-world that is simulated by conforming virtual effects to the three-dimensional (3D) geometry of a real-world venue from the vantage point of each user. It is noted that, as used herein, the feature "virtual effect" refers to one or more virtual images used to overlay an image of a real-world object. Moreover, "virtual effect" refers to one or more virtual images in the form of environmental features, such as lighting, color, or structural/architectural features of a venue, or to simulations of persons, avatars, characters, caricatures of a person, animals, plants, and living things of various species or varieties, as well as inanimate objects.

In some implementations, the virtual-world simulators and methods disclosed by the present application may be substantially or fully automated. It is noted that, as used in the present application, the terms "automation," "automated," and "automating" refer to systems and processes that do not require the participation of a human system operator. Although in some implementations a human user may make adjustments to the automated systems described herein that human involvement is optional. Thus, in some implementations, the methods described in the present application may be performed under the control of hardware processing components of the disclosed virtual-world simulators.

FIG. 1A shows a diagram of exemplary virtual-world simulator 100A, according to one implementation. As shown in FIG. 1A, virtual-world simulator 100A includes computing platform 110 having hardware processor 112, and memory 114 implemented as a non-transitory storage device containing virtual effects conforming software code 118. In addition, virtual-world simulator 100A includes tracking system 102 and projection device 104 each communicatively coupled to computing platform 110. As further shown in FIG. 1A, in some implementations, virtual-world simulator 100A may also include mapping device 106 communicatively coupled to computing platform 110.

It is noted that, as defined for the purposes of the present application, the expression "communicatively coupled" may mean physically integrated with, or physically discrete from but in communication with. Thus, one or more of tracking system 102, projection device 104, and mapping device 106 may be integrated with computing platform 110, or may be adjacent to or remote from computing platform 110 while being in wired or wireless communication with computing platform 110.

As further shown in FIG. 1A, virtual-world simulator 100A is implemented within real-world venue 120 including one or more objects or structures, represented by floor 122, wall 124, object 126a, and object 126b having curved surface 128. Also shown in FIG. 1A is virtual-world simulation 130 produced using projection device 104 of virtual-world simulator 100A, and user 132 engaging with virtual-world simulation 130.

In some implementations, real-world venue 120 may take the form of a personal residence, a theme park attraction, a game environment, or a film or broadcast studio, to name a few examples. It is noted that although FIG. 1A explicitly shows real-world venue 120 to include only floor 122, wall 124, and objects 126a and 126b, that simplified representation is provided merely for conceptual clarity. More generally, real-world venue 120 may include multiple structures, such as additional walls, a ceiling, and one or more additional objects, such as articles of furniture and/or art or other decorative objects, for example.

It is noted that, although the present application refers to virtual effects conforming software code 118 as being stored in memory 114 for conceptual clarity, more generally, memory 114 may take the form of any computer-readable non-transitory storage medium. The expression "computer-readable non-transitory storage medium," as used in the present application, refers to any medium, excluding a carrier wave or other transitory signal that provides instructions to hardware processor 112 of computing platform 110. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Tracking system 102 may include a camera, camera array, or one or more other types of optical sensors for determining the moving perspective of user 132 as user 132 moves around in real-world venue 120. As another alternative, or in addition, tracking system 102 may include multiple components distributed within real-world venue 120 and configured to perform radio-signal triangulation to determine the moving perspective of user 132. As yet another alternative, computing platform 110 may utilize optional mapping device 106 configured to perform simultaneous localization and mapping (SLAM) to determine the moving perspective of user 132 in real-world venue 120.

It is noted that, as defined for the purposes of the present application, the expression "moving perspective," as it applies to user 132, refers to the eye-point perspective or viewing perspective of user 132. Thus, for example, in some implementations, tracking system 102 may be configured to perform head tracking, eye tracking, or skeleton tracking of user 132 in real-world venue 120. Alternatively, or in addition, in some implementations tracking system 102 may be configured to perform hand tracking of user 132 in order to enable detection of gestures, such as a pointing motion, performed by user 132.

In some implementations, projection device 104 may include one or more projectors configured not only to project virtual-world simulation 130 onto real-world venue 120, but to conform the virtual effects included in virtual-world simulation 130 to the 3D geometry of real-world venue 120 from the vantage point of user 132 as user 132 moves within real-world venue 120. By way of example, hardware processor 112 of computing platform 110 may execute virtual effects conforming software code 118 to control projection device 104 to warp or otherwise distort a virtual effect projected onto object 126b of real-world venue 120 to conform the virtual effect to curved surface 128 of object 126b from the present vantage point of user 132, i.e., the location of the moving perspective of user 132 at the time of projection of the virtual effect, and to vary that conformal projection in real-time as the vantage point of user 132 changes. As a result, virtual-world simulator 100A can advantageously generate virtual-world simulation 130 providing user 132 with a realistic and highly immersive 3D virtual experience without requiring user 132 to wear an augmented reality (AR) viewing device, such as an AR headset or glasses, or to carry an AR enabled personal communication device, such as a smartphone or tablet computer.

Figure 1B:
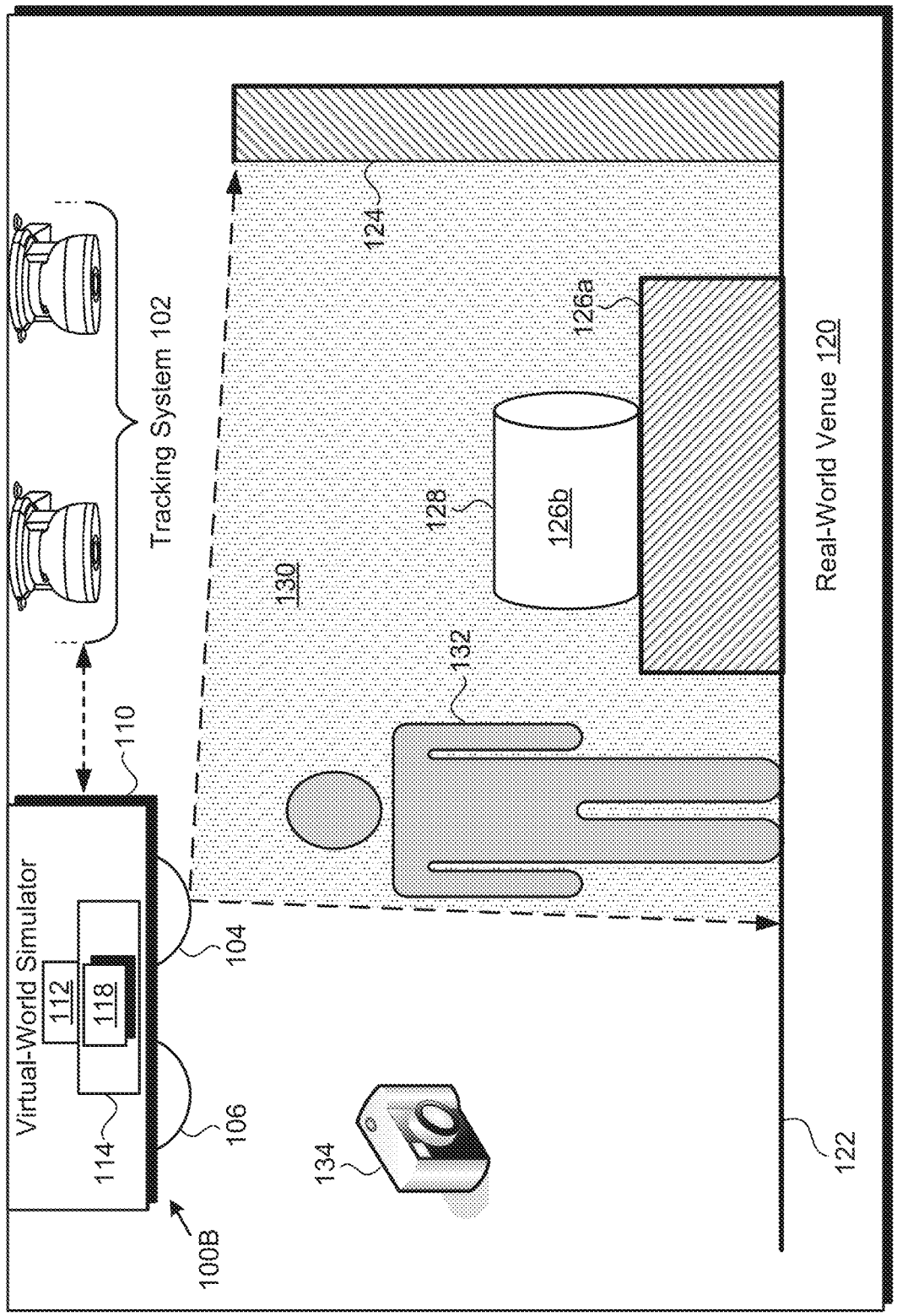
FIG. 1B shows a diagram of an exemplary virtual-world simulator, according to another implementation.

FIG. 1B shows a diagram of exemplary virtual-world simulator 100B, according to another implementation. It is noted that virtual-world simulator 100B, in FIG. 1B, corresponds in general to virtual-world simulator 100A, in FIG. 1A, and may share any of the characteristics attributed to that corresponding simulator by the present disclosure. It is further noted that any feature in FIG. 1B identified by a reference number identical to a reference number appearing in FIG. 1A corresponds to that previously described feature and may share any of the characteristics attributed to it above.

According to the exemplary implementation shown in FIG. 1B, and in contrast to the implementation shown in FIG. 1A, the moving perspective being tracked in FIG. 1B is the moving perspective of camera 134 as camera 134 is moved within real-world environment 120 to obtain images of user 132 in virtual-world simulation 130. It is noted that camera 134 is not a component of virtual world simulator 100B, i.e., camera 134 is not part of tracking system 102. It is further noted that, as defined for the purposes of the present application, the expression "moving perspective," as it applies to camera 134, refers to the image capture perspective or viewing perspective of camera 134. Thus, for example, in some implementations, tracking system 102 may be configured to track the location and orientation of camera 134 in real-world venue 120. Camera 134 may include one or more red-green-blue (RGB) still image cameras and/or video cameras. Moreover, in some implementations, camera 134 may correspond to an array of RGB still image and/or video cameras configured to generate a panoramic image of a venue, such as real-world venue 120.

In the exemplary implementation shown in FIG. 1B, for example, hardware processor 112 of computing platform 110 may execute virtual effects conforming software code 118 to control projection device 104 to warp or otherwise distort virtual effects projected onto real-world venue 120 to conform the virtual effects to the 3D geometry of objects within real-world venue 120 from the present vantage point of camera 134, i.e., the location of the moving perspective of camera 134 at the time of projection of the virtual effect, and to vary that conformal projection in real-time as the vantage point of camera 134 changes. As a result, virtual-world simulator 100B can advantageously generate virtual-world simulation 130 enabling transformation of real-world venue 120 in the form of a personal residence or photography studio into a movie set providing a backdrop for a performance by user 132, without requiring user 132 to be present at a movie studio backlot, or even to leave his/her own home.

Figure 1C:
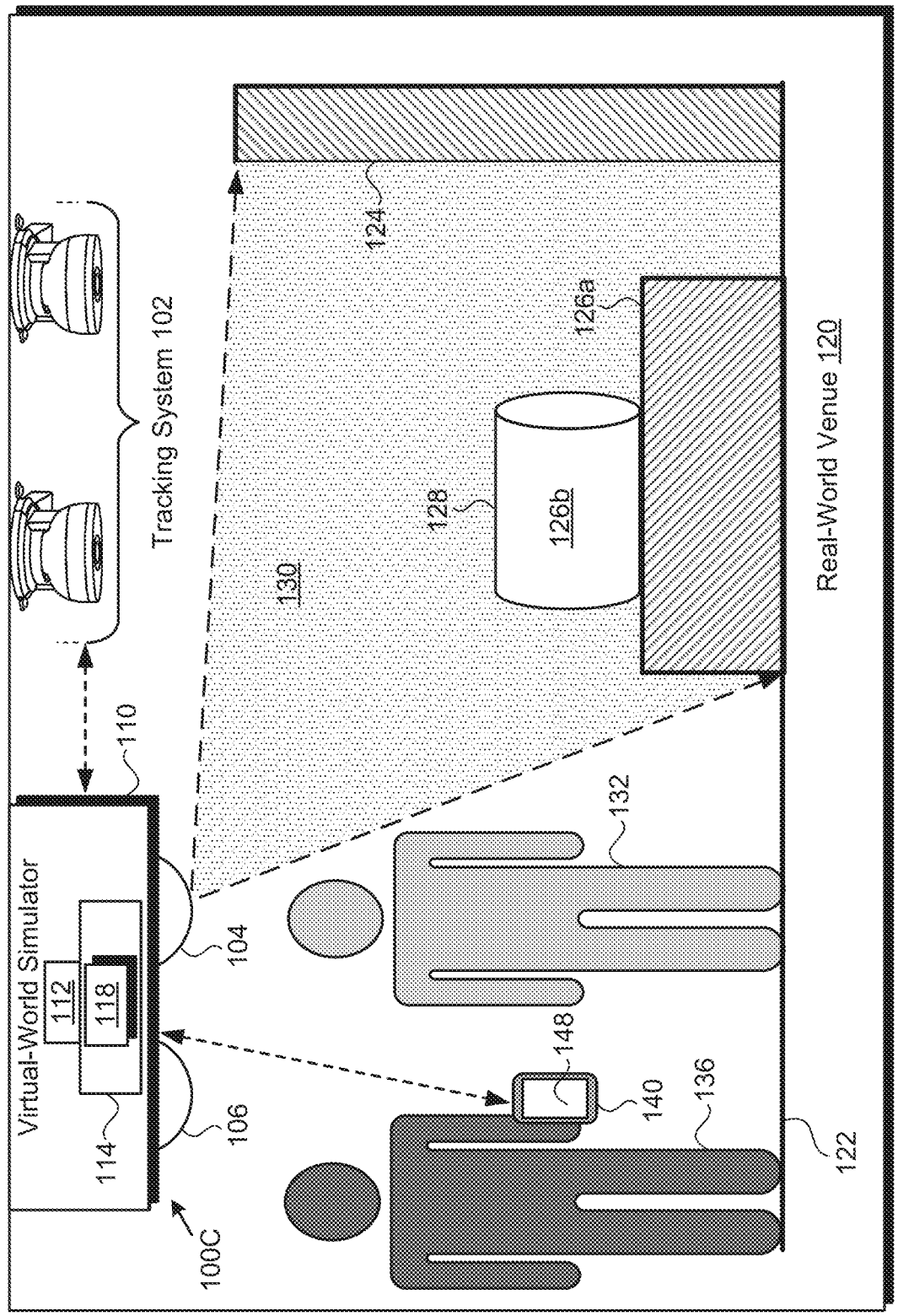
FIG. 1C shows a diagram of an exemplary virtual-world simulator, according to another implementation.

FIG. 1C shows a diagram of exemplary virtual-world simulator 100C, according to another implementation. It is noted that virtual-world simulator 100C, in FIG. 1C, corresponds in general to virtual-world simulator 100A and 100B, in FIGS. 1A and 1B, respectively, and may share any of the characteristics attributed to that corresponding simulator by the present disclosure. It is further noted that any feature in FIG. 1C identified by a reference number identical to a reference number appearing in FIG. 1A or 1B corresponds to that previously described feature and may share any of the characteristics attributed to it above. In addition to the features shown and described by reference to FIGS. 1A and 1B, FIG. 1C includes second user 136 and may optionally include user device 140 having display 148.

According to the exemplary implementation shown in FIG. 1C, and in contrast to the implementations shown in FIGS. 1A and 1B, virtual-world simulator 100C is configured to use tracking system 102 to track the moving perspective of second user 136, while also tracking the moving perspective of user 132, and to generate a virtual-world simulation conforming the virtual effects included in virtual-world simulation 130 to the geometry of real-world venue 120 from the present vantage point of the second moving perspective of second user 136 while concurrently providing real-world simulation 130 from the present vantage point of the moving perspective of user 132. In some implementations, projection device 104 may be a high-frame-rate projector, or a polarized projection device, for example, configured to project multiple perspectives of virtual-world simulation 130 onto real-world venue 120 so as to cause those multiple perspectives to appear to be produced concurrently in real-time to user 132 and second user 136.

In other implementations, virtual-world simulator 100C may communicate with user device 140 operated by second user 136 to provide second user 136 with virtual-world simulation 130 conformed to the geometry of real-world venue 120 from the vantage point of second user 136 via display 148 of user device 140. User device 140 may take the form of a smartphone or tablet computer, as depicted in FIG. 1C, or may be implemented as an AR viewer such as an AR headset, goggles, or glasses. Alternatively, in some implementations, user device 140 may be another type of smart wearable device including display 148, such as a smartwatch.

In one implementation, hardware processor 112 of computing platform 110 may execute virtual effects conforming software code 118 to detect user device 140 utilized by second user 136 of real-world venue 120, to track the second moving perspective of second user 136 in real-world venue 120 using tracking system 102, and to generate a virtual-world simulation for second user 136 by conforming the virtual effects included in virtual-world simulation 130 to the geometry of real-world venue 120 from the present vantage point of the moving perspective of second user 136. In that implementation, hardware processor 112 of computing platform 110 may further execute virtual effects conforming software code to transmit the generated simulation to user device 140 for display to second user 136 via display 148, while concurrently projecting virtual-world simulation 130 from the present vantage point of the moving perspective of user 132. It is noted that display 148 may take the form of a liquid crystal display (LCD), a light-emitting diode (LED) display, an organic light-emitting diode (OLED) display, or using any other suitable display technology that performs a physical transformation of signals to light.

Figure 1D:
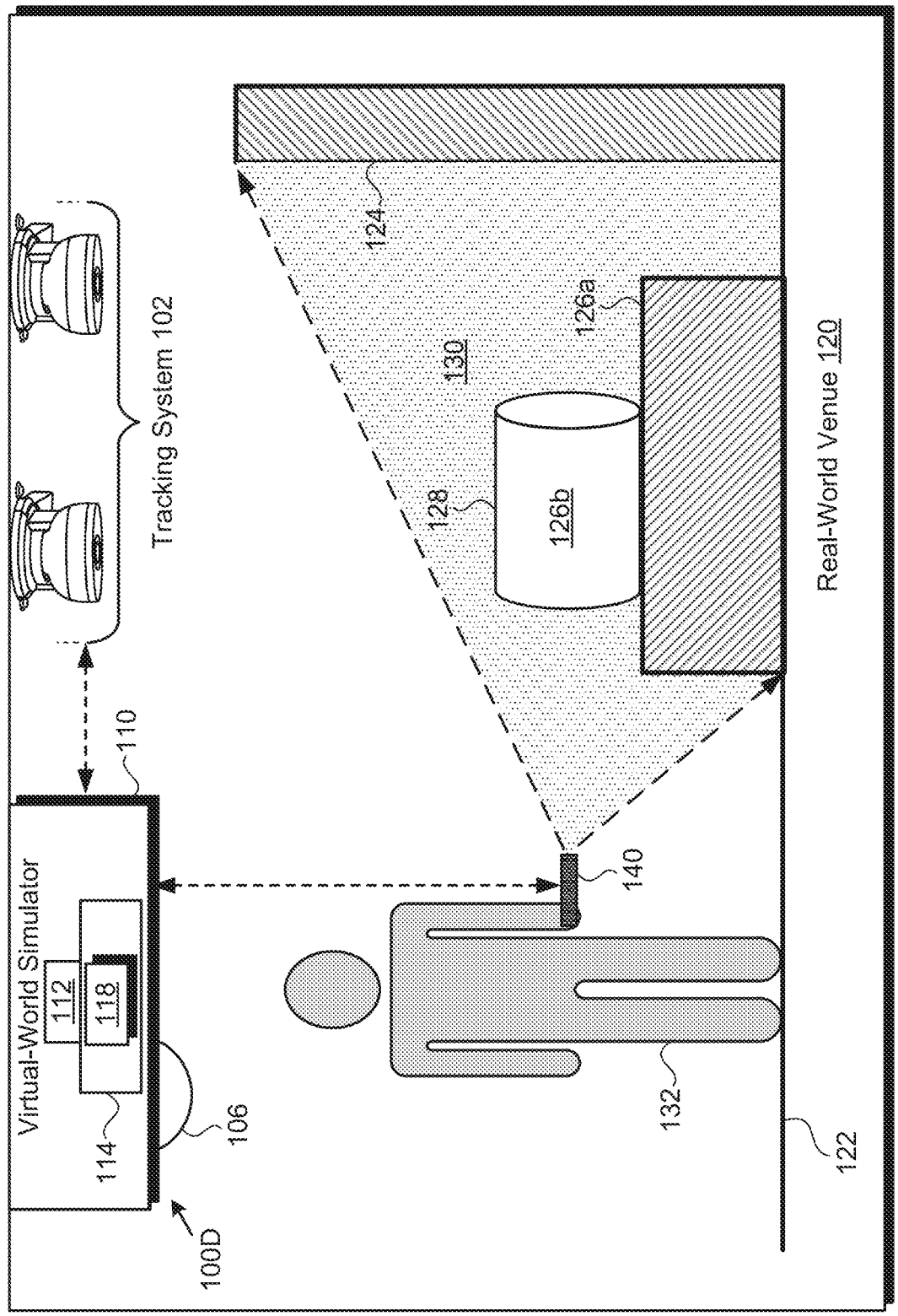
FIG. 1D shows a diagram of an exemplary virtual-world simulator, according to yet another implementation.

FIG. 1D shows a diagram of exemplary virtual-world simulator 100D, according to yet another implementation. It is noted that virtual-world simulator 100D, in FIG. 1D, corresponds in general to virtual-world simulator 100A, 100B, and 100C, in FIGS. 1A, 1B, and 1C, respectively, and may share any of the characteristics attributed to that corresponding simulator by the present disclosure. It is further noted that any feature in FIG. 1D identified by a reference number identical to a reference number appearing in FIG. 1A, 1B, or 1C corresponds to that previously described feature and may share any of the characteristics attributed to it above.

According to the exemplary implementation shown in FIG. 1D, user device 140 may be a handheld device configured to project virtual-world simulation 130 onto real-world venue 120. It is noted that in the exemplary implementation shown in FIG. 1D, user device 140 may be included as a remote component of virtual-world simulator 100D, communicatively coupled to computing platform 110. In those implementations, user device 140 may include projection device 104 shown in FIGS. 1A, 1B, and 1C. That is to say, in some implementations the projection device of virtual-world simulator 100D may be handheld user device 140 configured for use by user 132 of real-world venue 120. Alternatively, in some implementations, virtual-world simulator 100D may be integrated into user device 140, thereby imbuing user device 140 with substantially all of the features and functionality of any of virtual-world simulators 100A, 100B, 100C, and 100D (hereinafter "virtual-world simulators 100A-100D") disclosed in the present application.

Figure 2:
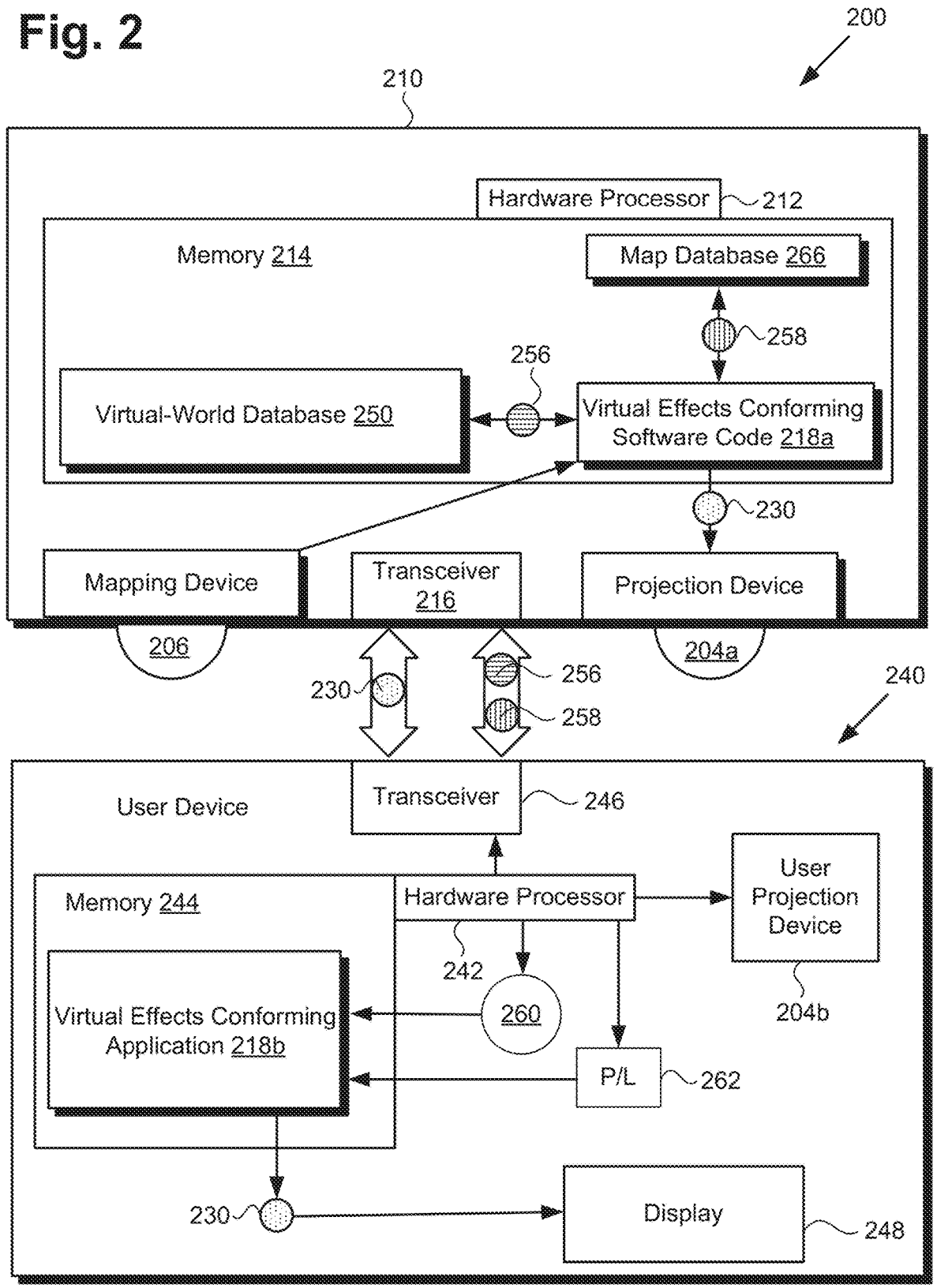
FIG. 2 shows a diagram including a more detailed exemplary representation of a virtual-world simulator, according to one implementation.

FIG. 2 shows a more detailed representation of exemplary user device 240 in combination with computing platform 210 of virtual-world simulator 200, according to one implementation. As shown in FIG. 2, user device 240 is communicatively coupled to computing platform 210. Computing platform 210 includes hardware processor 212, and memory 214 implemented as a non-transitory storage device. In addition, in some implementations, computing platform 210 may include one or more of projection device 204a, mapping device 206 and transceiver 216. As further shown in FIG. 2, memory 214 contains virtual effects conforming software code 218a, virtual-world database 250 storing virtual effects 256, and may further contain map database 266 having stored therein map 258 of the geometry of real-world venue 120 shown in FIGS. 1A, 1B, 1C, and 1D (hereinafter "FIGS. 1A-1D").

User device 240 includes hardware processor 242, and memory 244 implemented as a non-transitory storage device storing virtual effects conforming application 218b. As also shown in FIG. 2, user device 240 may include one or more of transceiver 246, one or more cameras 260 (hereinafter "camera(s) 260"), user projection device 204b, one or more position/location sensors 262 (hereinafter "P/L sensor(s) 262"). Also shown in FIG. 2 is virtual-world simulation 230, which, as discussed below, may be generated on computing platform 210 and projected using projection device 204a, may be generated on computing platform 210 and be transmitted to user device 240 for display on display 248 or for projection by user projection device 204b, or may be generated on user device 240 for display on display 248 or for projection by user projection device 204b.

Virtual-world simulator 200 including computing platform 210 having hardware processor 212, projection device 204a, optional mapping device 206, and memory 214 including virtual effects conforming software code 218a, virtual-world database 250, and map database 266 corresponds in general to any of virtual-world simulators 100A-100D including computing platform 110 having hardware processor 112, projection device 104, optional mapping device 106, and memory 114 including virtual effects conforming software code 118, variously shown in FIGS. 1A-1D. Thus, computing platform 210, hardware processor 212, projection device 204a, optional mapping device 206, memory 214, and virtual effects conforming software code 218a may share any of the characteristics attributed to respective computing platform 110, hardware processor 112, projection device 104, optional mapping device 106, memory 114, and virtual effects conforming software code 118 by the present disclosure, and vice versa. Moreover, it is noted that although not shown in FIG. 2, like virtual-world simulators 100A-100D, computing platform 210 of virtual-world simulator 200 is communicatively coupled to a tracking system corresponding to tracking system 102. It is further noted that virtual-world simulation 230, in FIG. 2, corresponds in general to virtual-world simulation 130 in FIGS. 1A-1D, and those corresponding features may share any of the characteristics attributed to either corresponding feature herein.

User device 240 including display 248 corresponds in general to user device 140 including display 148, in FIGS. 1C and 1D, and those corresponding features may share any of the characteristics attributed to either corresponding feature by the present disclosure. Thus, like user device 240, user device 140 may include features corresponding to hardware processor 242, transceiver 246, camera(s) 260, P/L sensor(s) 262, user projection device 204b, and memory 244 storing virtual effects conforming application 218b. In addition, like user device 140, user device 240 may take a variety of forms. For example, as described above by reference to FIGS. 1C and 1D, user device 140/240 may be a handheld device, such as a handheld projection device, or a smartphone or tablet computer. Alternatively, and as also described above, in some implementations, user device 140/240 may be a wearable device, such as a smartwatch, or an AR headset, goggles, or glasses. Moreover, like display 148, display 248 may be an LCD, an LED display, an OLED display, or a display using any other suitable display technology that performs a physical transformation of signals to light.

Transceiver 216 and/or transceiver 246 may be implemented as wireless communication hardware and software enabling user device 140/240 to exchange data with computing platform 110/210. For example, transceiver 216 and/or transceiver 246 may be implemented as fourth generation of broadband cellular technology (4G) wireless transceivers, or as 5G wireless transceivers configured to satisfy the IMT-2020 requirements established by the International Telecommunication Union (ITU). Alternatively, or in addition, transceiver 216 and/or transceiver 246 may be configured to communicate via one or more of WiFi, Bluetooth, ZigBee, and 60 GHz wireless communications methods.

Camera(s) 260 may include one or more RGB still image cameras and/or video cameras. Moreover, in some implementations, camera(s) 260 may correspond to an array of RGB still image and/or video cameras configured to generate a panoramic image of a venue, such as real-world venue 120. P/L sensor(s) 262 may include one or more accelerometers, and/or gyroscopes, and/or a GPS receiver, and/or a magnetometer, for example. In some implementations, P/L sensor(s) 262 may be implemented as an inertial measurement unit (IMU), as known in the art.

With respect to virtual effects conforming application 218b, it is noted that in some implementations, virtual effects conforming application 218b may be a thin client application of virtual effects conforming software code 118/218a. In those implementations, virtual effects conforming application 218b may enable user device 140/240 to obtain one or more of virtual effects 256, map 258 of the geometry of real-world venue 120, and/or virtual-world simulation 130/230. Moreover, in some implementations, virtual effects conforming application 218b, executed by hardware processor 242 of user device 140/240, may track the location of user 132 in real-world venue 120 using P/L sensor(s) 262, and may communicate that tracked location to computing platform 110/210.

However, in other implementations, virtual effects conforming application 218b may include substantially all of the features and functionality attributed to virtual effects conforming software code 118/218a by the present application. Moreover, in some of those implementations, user device 140/240 may serve as the computing platform, and/or projection device, and/or tracking system, and/or mapping device of virtual-world simulator 100/200. In other words, in some implementations, virtual-world simulator 100/200 may be incorporated into user device 14/240.

Figure 3:
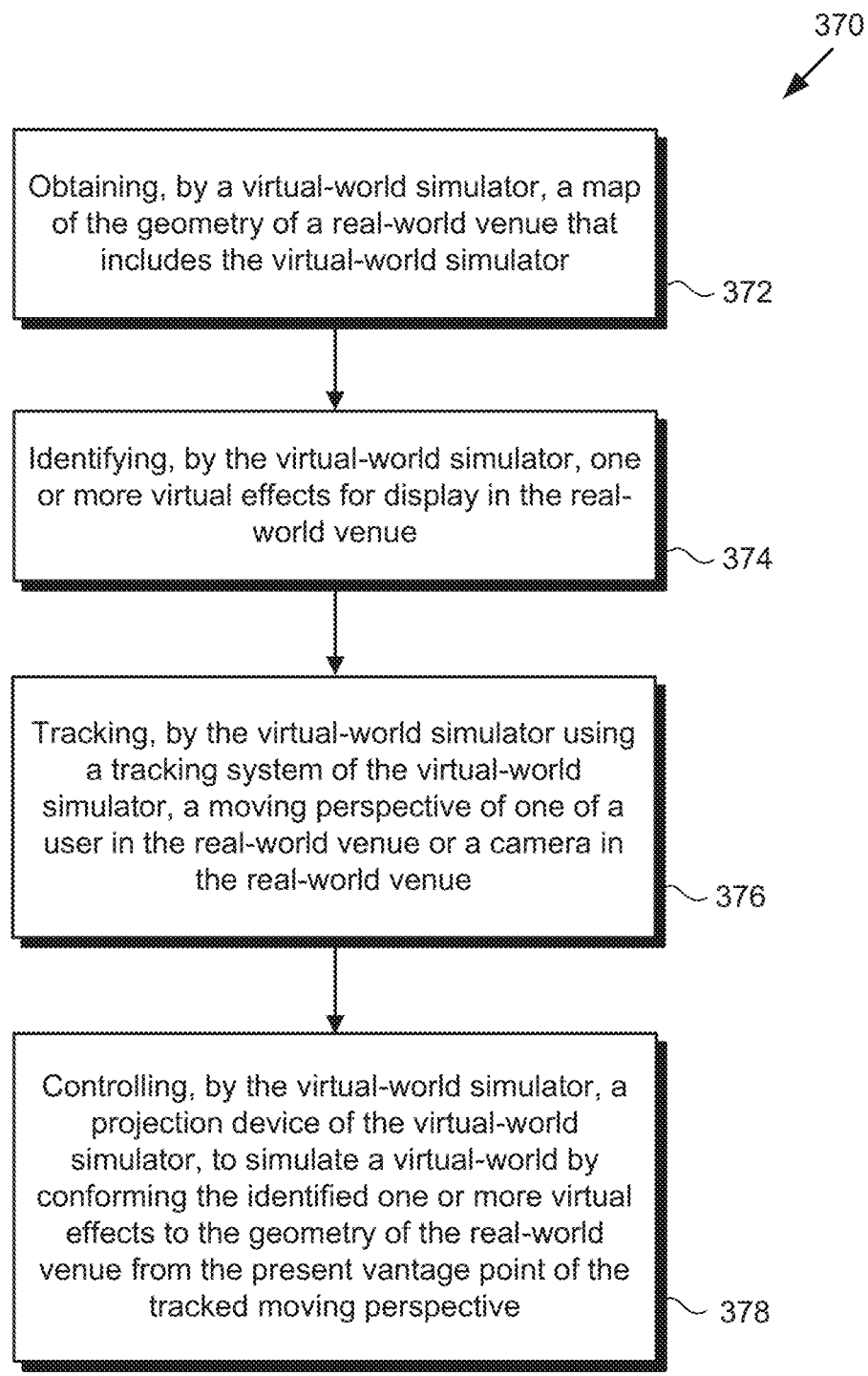
FIG. 3 is a flowchart presenting an exemplary method for use by a virtual-world simulator, according to one implementation.

The functionality of virtual effects conforming software code 118/218a and virtual effects conforming application 218b will be further described by reference to FIG. 3 in combination with FIGS. 1A-1D and 2. FIG. 3 shows flowchart 370 presenting an exemplary method for use by a virtual-world simulator. With respect to the method outlined in FIG. 3, it is noted that certain details and features have been left out of flowchart 370 in order not to obscure the discussion of the inventive features in the present application.

Referring to FIG. 3 in combination with FIGS. 1A-1D, and 2, flowchart 370 begins with obtaining map 258 of the geometry of real-world venue 120 (action 372). In some implementations, map 258 may be a previously produced 3D map of the geometry of real-world venue 120 and may be stored in map database 266, or may have been previously produced and be obtainable from a third party or other remote provider. In some use cases in which map 258 already exists, hardware processor 112/212 of computing platform 110/210 may execute virtual effects conforming software code 118/218a to obtain map 258 from map database 266 stored in memory 114/214 of computing platform 110/210. Alternatively, in some use cases in which map 258 already exists, hardware processor 142/242 of user device 140/240 may execute virtual effects conforming software application 218b to obtain map 258 from computing platform 110/210.

As noted above, in some implementations, virtual-world simulators 100A-100D/200 may include optional mapping device 106/206. Mapping device 106/206 may include a camera, such as a three hundred and sixty degree (360°) camera, a camera array, or one or more other types of optical sensors for mapping real-world venue 120. Alternatively, or in addition, mapping device 106/206 may include a light detection and ranging (LIDAR) device for mapping real-world venue 120. Thus, in some implementations, obtaining map 258 of the geometry of real-world venue 120 may be performed by virtual effects conforming software code 118/218a of computing platform 110/210, executed by hardware processor 112/212, and using mapping device 106/206 to generate map 258 of the geometry of real-world venue 120. Moreover, in some implementations, map 258 may be generated as a 3D map using mapping device 106/206.

It is noted that, in some implementations, virtual-world simulators 100A-100D/200 may be configured to use mapping device 106/206 to generate map 258 of the geometry of real-world venue 120 substantially in real-time with respect to the moving perspective of user 132, camera 134, or second user 136. In those implementations, map 258 can advantageously be updated to include dynamic changes to the geometry of real-world venue 120, such as the movement of furniture or other objects within real-world venue 120 during the presence of user 132, camera 134, or second user 136 in real-world venue 120.

Flowchart 370 continues with identifying one or more virtual effects 256 for display in real-world venue 120 (action 374). Virtual effects 356 may include a virtual background environment, as well as one or more virtual assets in the form of simulated human or animated characters, or simulated furniture, artwork, or other objects or props, for example. In some implementations, action 374 may be performed by virtual effects conforming software code 118/218a of computing platform 110/210, executed by hardware processor 112/212, and using virtual-world database 250 stored in memory 114/214 of computing platform 110/210. Alternatively, in other implementations, hardware processor 142/242 of user device 140/240 may execute virtual effects conforming software application 218b to identify one or more virtual effects 256 stored in virtual-world database 250 and to obtain virtual effects 256 from computing platform 110/210.

Flowchart 370 continues with tracking the moving perspective of user 132 of real-world venue 120 or the moving perspective of camera 134 in real-world venue 120 (action 376). As discussed above, virtual-world simulator 100A-100D/200 may include tracking system 102 communicatively coupled to computing platform 110/210. Tracking system 102 may be configured to track the moving perspective of user 132 or camera 134 in real-world venue 120. For example, and as also discussed above, tracking system 102 may include a camera, camera array, or one or more other types of optical sensors for tracking the perspective of user 132 or camera 134 as user 132 or camera 134 moves within real-world venue 120.

As another alternative, or in addition to the use of one or more cameras, tracking system 102 may include multiple components distributed within real-world venue 120 and configured to perform radio-signal triangulation to track the moving perspective of user 132 or camera 134 in real-world venue 120. As yet another alternative, computing platform 110/210 may utilize optional mapping device 106/206 configured to utilize a SLAM technique to track the moving perspective of user 132 or camera 134 in real-world venue 120. Thus tracking of the moving perspective of user 132 or camera 134 in real-world venue 120 using tracking system 102 and/or mapping device 106/206 may be performed by virtual effects conforming software code 118/218a of computing platform 110/210, executed by hardware processor 104.

Alternatively, or in addition, in some implementations user device 140/240 may include P/L sensor(s) 262, and may be configured to monitor its own position and orientation in real-world venue 120, and to report that position and orientation to computing platform 110/210. In those implementations, user device 140/240 may utilize transceiver 246 to self-report its position and orientation in real-world venue 120. In some implementations, tracking of the moving perspective of user 132 or camera 134 in real-world venue 120 in response to self-reporting by user device 140/240 may be performed by virtual effects conforming software code 118/218a of computing platform 110/210, executed by hardware processor 112/212. However, in other implementations, tracking of the moving perspective of user 132 or camera 134 in real-world venue 120 may be performed by virtual effects conforming application 218b, executed by hardware processor 242 of user device 140/240, and based on data from P/L sensor(s) 262.

Flowchart 370 can conclude with controlling projection device 104/204a or user projection device 204b to project virtual-world simulation 130/230 by conforming the one or more virtual effects identified in action 374 to the geometry of real-world venue 120 from the present vantage point of the moving perspective of user 132 or camera 134 tracked in action 376 (action 378). Referring to FIGS. 1A and 2, for example, hardware processor 112/212 of computing platform 110/210 may execute virtual effects conforming software code 118/218a to control projection device 104/204a to warp or otherwise distort virtual effects 256 projected onto object 126b of real-world venue 120 to conform virtual effects 256 to curved surface 128 of object 126b from the present vantage point of user 132, i.e., the location of the moving perspective of user 132 at the time of projection of virtual effects 256, and to vary that conformal projection in real-time as the vantage point of user 132 changes. As a result, virtual-world simulator 100/200 can advantageously generate virtual-world simulation 130/230 providing user 132 with a realistic and highly immersive 3D virtual experience without requiring user 132 to wear an augmented reality AR viewing device, such as an AR headset, glasses, or to carry an AR enabled personal communication device such as a smartphone or tablet computer.

Referring to FIGS. 1B and 2, in the exemplary implementation shown in that figure, hardware processor 112/212 of computing platform 110/210 may execute virtual effects conforming software code 118/218a to control projection device 104/204a to warp or otherwise distort virtual effects 256 projected onto real-world venue 120 to conform virtual effects 256 to the 3D geometry of objects within real-world venue 120 from the present vantage point of camera 134, and to vary that conformal projection in real-time as the vantage point of camera 134 changes. As a result, virtual-world simulator 100/200 can advantageously generate virtual-world simulation 130/230 enabling transformation of real-world venue 120 in the form of a personal residence or photography studio into a movie set providing a backdrop for a performance by user 132, without requiring user 132 to be present at a movie studio backlot, or even to leave his/her own home.

Referring to FIGS. 1C and 2, in some implementations, virtual-world simulator 100C/200 may use tracking system 102 to track the moving perspective of second user 136, while also tracking the moving perspective of user 132, and to generate a virtual-world simulation conforming the virtual effects included in virtual-world simulation 130/230 to the geometry of real-world venue 120 from the present vantage point of the second moving perspective of second user 136 while concurrently providing real-world simulation 130/230 from the present vantage point of the moving perspective of user 132. As noted above, in some implementations, projection device 104/204a may be a high-frame-rate projector, or a polarized projection device, for example, configured to project multiple perspectives of virtual-world simulation 130/230 onto real-world venue 120 so as to cause those multiple perspectives to appear to be produced concurrently in real-time to user 132 and second user 136.

As further described above by reference to FIG. 1C, in other implementations, virtual-world simulator 100C/200 may communicate with user device 140/240 to provide second user 136 with virtual-world simulation 130/230 conformed to the geometry of real-world venue 120 from the present vantage point of second user 136 via display 148/248 of user device 140/240. In one such implementation, hardware processor 112/212 of computing platform 110/210 may execute virtual effects conforming software code 118/218a to generate a virtual-world simulation for second user 136 by conforming the virtual effects included in virtual-world simulation 130/230 to the geometry of real-world venue 120 from the present vantage point of the moving perspective of second user 136. In that implementation, hardware processor 112/212 of computing platform 110/210 may further execute virtual effects conforming software code 118/218a to transmit the generated simulation to user device 140/240 for display to second user 136 via display 148/248, while concurrently projecting virtual-world simulation 130/230 from the present vantage point of the moving perspective of user 132.

Referring to FIGS. 1D and 2, in some implementations, user device 140/240 may be a handheld device configured to project virtual-world simulation 130/230 onto real-world venue 120. As noted above, in some implementations user device 140/240 may be included as a remote component of virtual-world simulator 100D/200, communicatively coupled to computing platform 110/210. In those implementations, user device 140/240 may include user projection device 204b. That is to say, in some implementations the projection device of virtual-world simulator 100/200 may be handheld user device 140/240 configured for use by user 132 of real-world venue 120. Alternatively, in some implementations, virtual-world simulator 100/200 may be integrated into user device 140/240, thereby imbuing user device 140/240 with substantially all of the features and functionality of virtual-world simulators 100A-100D/200 disclosed in the present application. Thus, in some implementations, action 378 may be performed by virtual effects conforming software application 218b, executed by hardware processor 242 of user device 140/240, and using user projection device 204b.

It is noted that, in some implementations, hardware processor 112/212 of computing platform 110/210 may execute virtual effects conforming software code 118/218a to perform actions 372, 374, and 376 in any order, i.e., action 376 may precede action 374, while either or both of actions 374 and 376 may precede action 372. In other implementations, hardware processor 112/212 may execute virtual effects conforming software code 118/218a to perform one or more of actions 372, 374, and 376 in parallel, i.e., substantially concurrently. It is further noted that, in some implementations, hardware processor 112/212 may execute virtual effects conforming software code 118/218a to perform actions 372, 374, 376, and 378 in an automated process from which human participation may be omitted. It is also noted that although the present application has focused on the generation of virtual-world simulation 130/230 using visual virtual effects 256, in some implementations, audio effects can also be generated to enhance the verisimilitude of virtual-world simulation 130/230.

For example, real-world venue 120 may include an audio system communicatively coupled to computing platform 110/210 of virtual-world simulator 100/200 and configured to modulate environmental sounds, as well as speech by virtual characters, to agree with the relative distances of the virtual sources of those sounds from the present vantage point of user 132 and/or second user 136. Such an audio system may include multiple audio output devices, such as speakers of different sizes and power output capabilities for example, distributed throughout real-world environment 120. In one implementation, for instance, hardware processor 112/212 of computing platform 110/210 may execute virtual effects conforming software code 118/218a to control the output of individual audio system components to enhance the illusion that a particular visual effect is physically close to, or far from, the user or users engaging with virtual-world simulation 130/230.

Thus, the present application discloses virtual-world simulators and methods for use by such simulators that overcome the drawbacks and deficiencies in the conventional art. According to the present novel and inventive concepts, one or more users can advantageously experience a virtual-world that is simulated by conforming virtual effects to the 3D geometry of a real-world venue from the vantage point of each user. Moreover, and as a significant improvement over the present state-of-the-art, the virtual-world simulation solution disclosed by the present application can advantageously be used to provide users with realistic and highly immersive individualized 3D virtual experiences without requiring those users to wear an augmented reality AR viewing device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A virtual-world simulator comprising:
  a computing platform including a hardware processor and a memory storing a software code;
  a tracking system communicatively coupled to the computing platform; and
  a projection device communicatively coupled to the computing platform;
  the hardware processor configured to execute the software code to:
    obtain a map of a geometry of a real-world venue;
    identify one or more virtual effects for display in the real-world venue;
    track, using the tracking system, a moving perspective of a camera in the real-world venue; and
    control the projection device to simulate a virtual-world by conforming the identified one or more virtual effects to the geometry of the real-world venue from a present vantage point of the tracked moving perspective.

2. The virtual-world simulator of claim 1, wherein the map is a three-dimensional (3D) map of the geometry of the real-world venue.

3. The virtual-world simulator of claim 1, further comprising a mapping device communicatively coupled to the computing platform, wherein the hardware processor is further configured to execute the software code to:
  generate, using the mapping device, the map of the geometry of the real-world venue.

4. The virtual-world simulator of claim 3, wherein the mapping device comprises at least one of a mapping camera or a light detection and ranging (LIDAR) device.

5. The virtual-world simulator of claim 1, wherein the map of the geometry of the real-world venue comprises a three-dimensional (3D) map of the geometry of the real-world venue.

6. The virtual-world simulator of claim 1, wherein the hardware processor is further configured to execute the software code to:
  track a user moving perspective in the real-world venue; and control the projection device to further simulate the virtual-world by conforming the identified one or more virtual effects to the geometry of the real-world venue from a second present vantage point of the user moving perspective of the user while concurrently simulating the virtual-world from the present vantage point of the moving perspective of the camera.

7. The virtual-world simulator of claim 1, wherein the hardware processor is further configured to execute the software code to:
detect a user device utilized by a user in the real-world venue;
track a user moving perspective of the user in the real-world venue;
generate a simulation of the virtual-world by conforming the identified one or more virtual effects to the geometry of the real-world venue from a second present vantage point of the user moving perspective of the user; and
transmit the generated simulation to the user device for display to the user while concurrently simulating the virtual-world from the present vantage point of the moving perspective of the camera.

8. The virtual-world simulator of claim 1, wherein the camera is configured to obtain an image of a user in the simulated virtual-world.

9. A method for use by a virtual-world simulator including a computing platform having a hardware processor and a memory storing a software code, the computing platform communicatively coupled to a tracking system and a projection device, the method comprising:
obtaining, by the software code executed by the hardware processor, a map of a geometry of a real-world venue;
identifying, by the software code executed by the hardware processor, one or more virtual effects for display in the real-world venue;
tracking, by the software code executed by the hardware processor and using the tracking system, a moving perspective of a camera in the real-world venue; and
controlling, by the software code executed by the hardware processor, the projection device to simulate a virtual-world by conforming the identified one or more virtual effects to the geometry of the real-world venue from a present vantage point of the tracked moving perspective.

10. The method of claim 9, wherein the map is a three-dimensional (3D) map of the geometry of the real-world venue.

11. The method of claim 9, wherein the virtual-world simulator further comprises a mapping device communicatively coupled to the computing platform, the method further comprising:
generating, by the software code executed by the hardware processor and using the mapping device, the map of the geometry of the real-world venue.

12. The method of claim 11, wherein the mapping device comprises at least one of a mapping camera or a light detection and ranging (LIDAR) device.

13. The method of claim 9, wherein the map of the geometry of the real-world venue comprises a three-dimensional (3D) map of the geometry of the real-world venue.

14. The method of claim 9, further comprising:
tracking, by the software code executed by the hardware processor and using the tracking system, a user moving perspective in the real-world venue; and
controlling, by the software code executed by the hardware processor, the projection device to further simulate the virtual-world by conforming the identified one or more virtual effects to the geometry of the real-world venue from a second present vantage point of the user moving perspective of the user while concurrently simulating the virtual-world from the present vantage point of the moving perspective of the camera.

15. The method of claim 9, further comprising:
detecting, by the software code executed by the hardware processor, a user device utilized by a user in the real-world venue;
tracking, by the software code executed by the hardware processor and using the tracking system, a user moving perspective of the user in the real-world venue;
generating, by the software code executed by the hardware processor, a simulation of the virtual-world by conforming the identified one or more virtual effects to the geometry of the real-world venue from a second present vantage point of the user moving perspective of the user; and
transmitting, by the software code executed by the hardware processor, the generated simulation to the user device for display to the user while concurrently simulating the virtual-world from the present vantage point of the moving perspective of the camera.

16. The method of claim 9, wherein the camera is configured to obtain an image of a user in the simulated virtual-world.

* * * * *